(12) United States Patent
Dohi

(10) Patent No.: US 6,429,920 B1
(45) Date of Patent: Aug. 6, 2002

(54) REFLECTING TYPE LIQUID CRYSTAL DISPLAY DEVICE

(75) Inventor: Atsushi Dohi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 141 days.

(21) Appl. No.: 09/585,924

(22) Filed: Jun. 2, 2000

(30) Foreign Application Priority Data

Jun. 4, 1999 (JP) .......................................... 11-158662

(51) Int. Cl.$^7$ ............................................ G02F 1/1335
(52) U.S. Cl. ...................... 349/119; 349/113; 349/117
(58) Field of Search ................................ 349/113, 117, 349/118, 119

(56) References Cited

U.S. PATENT DOCUMENTS 5,585,950 A * 12/1996 Nishino et al. ............. 349/118

FOREIGN PATENT DOCUMENTS

| JP | 10-161110 | 6/1998 |
| JP | 10-170906 | 6/1998 |

* cited by examiner

*Primary Examiner*—William L. Sikes
*Assistant Examiner*—Dung Nguyen
(74) *Attorney, Agent, or Firm*—David G. Conlin; Dike, Bronstein, Roberts & Cushman, IP Practice Group of Edwards & Angell

(57) ABSTRACT

An object of the invention is to obtain achromatic display with high contrast and high lightness. A reflection type liquid crystal display device of NB mode comprises a liquid crystal cell having an STN type liquid crystal layer; a first phase difference plate; a second phase difference plate; a polarizing plate, the first and second phase difference plates and polarizing plate being disposed on one surface of the liquid crystal cell in this order; and a reflecting layer disposed in the liquid crystal cell, the reflecting layer forming the other surface of the liquid crystal cell. The liquid crystal layer retardation $\Delta nLC.dLC$, the first phase difference plate retardation $\Delta n1.d1$ and the second phase difference plate retardation $\Delta n2.d2$ are selected from the ranges of 660 nm to 830 nm, 120 nm to 240 nm and 300 nm to 430 nm, respectively. A twist angle $\chi$ is selected from the range of 220° to 260°. Predetermined angles $\theta$, $\phi$ and $\varphi$ are selected from the ranges of −130° to −75, −20° to −60° and −15° to −45°, respectively.

9 Claims, 10 Drawing Sheets

REFLECTING TYPE LIQUID CRYSTAL DISPLAY DEVICE

BACKGROUND OF THE INVENTION

1. Field of the Invention

This present invention relates to a reflecting type liquid crystal display device, inclusive of a translucent type, for carrying out display by reflecting ambient light or front light. More particularly, the invention relates to an STN (super-twist nematic) type liquid crystal display device.

2. Description of the Related Art

Technical features required of portable terminal apparatuses are low power consumption, light weight and compactness in size. Since a liquid crystal display device can be driven at a relatively low voltage, the liquid crystal display device can reduce electric power consumption. In particular, since a reflecting type liquid crystal display device utilizes ambient light, it does not need back-light and therefore realizes light weight and compactness in size easily. The reflecting type liquid crystal display device suitable for portable terminal devices can be divided into two types, i.e., one type using two polarizing plates and another type using one polarizing plate.

In the type using two polarizing plates, a polarizing plate provided with a reflecting plate is bonded to a surface of either one of a pair of light transmitting substrates, which surface is opposite to a liquid crystal layer which is sandwiched between the light transmitting substrates. On the other hand, light incident from the other substrate side passes through the other substrate, the liquid crystal layer and the one substrate in this order, are reflected by the polarizing plate provided with the reflecting plate, and outgo as the light passes again through the one substrate, the liquid crystal layer and the other substrate in this order. In this instance, the image becomes double due to parallax resulting from the thickness of the substrate, and visibility drops markedly. In a reflecting type color liquid crystal display device using micro-color filters, for example, the light passes through the color filters of different colors between the incoming route and the outgoing route due to the parallax, and color purity drops markedly.

In the type using one polarizing plate, the reflecting plate can be disposed inside the liquid crystal cell. Therefore, parallax resulting from the thickness of the substrates described above does not occur. The drop of visibility resulting from doubling of the image and the drop of color resulting from color mixture do not occur, either. Therefore, the type using one polarizing plate has become predominant in the reflecting type liquid crystal display devices. In the reflecting type liquid crystal display device which uses one polarizing plate, incident ambient light is converted to linearly polarized light by a polarizing plate 2, then to elliptically polarized light by phase difference plates 3 and 4, are modulated by an STN type liquid crystal layer 9 and are reflected by a reflecting layer 15, as shown in FIG. 1. The travel of reflected light is the reverse of incident light, namely, reflected light outgoes after being modulated, and is observed.

It is important in the liquid crystal display device to greatly modulate an intensity ratio of outgoing light in the full wavelength range of visible light by an applied voltage to a liquid crystal layer. In general, when reflected light is employed to display in white, a birefringence phase difference between reflecting means and a polarizing plate is set to $\lambda$ or $2/\lambda$ and reflected light is converted to linearly polarized light by the reflecting means. And when reflected light is used for display in black, the birefringence phase difference between the reflecting means and the polarizing plate is set to $\lambda/4$ or $3\lambda/4$ and reflected light is converted to circularly polarized light by the reflecting means. Therefore, when a voltage is applied to the liquid crystal layer and the phase difference is modulated to $\lambda$, or $\lambda/2$ to $\lambda/4$, or $3\lambda/4$, in the full wavelength range, achromatic display can be accomplished with high contrast and high lightness.

However, the display operation of the STN type liquid crystal display device is carried out by virtue of birefringence and rotatory polarization of light. Moreover, the birefringence phase difference involves wavelength dispersion. For these reasons, it is difficult to obtain circularly polarized light and linearly polarized light with high accuracy in a visible light range of 400 nm to 800 nm. In the case of circularly polarized light, in particular, it is necessary to set not only the phase difference to $\lambda/4$ or $3\lambda/4$ but also to set the ratio of the major axis to the minor axis of an outgoing ellipse to 1:1. In other words, the angle of the absorption axis of the polarizing plate, $\Delta n.d$ and the angle of the slow axis of each phase difference plate, $\Delta n.d$ of the liquid crystal layer and the twist angle, must be optimized. Examples of them are disclosed in, for example, Japanese Unexamined Patent Publication JP-A 10-161110 (1998) and JP-A 10-170906 (1998).

According to the optical arrangement of the reflecting type STN type liquid crystal display devices using one polarizing plate, inclusive of the prior art technologies disclosed in JP-A 10-161110 and JP-A 10-170906, which have been proposed in the past, optimization of optical compensation is not complete. Therefore, optimization of the contrast, lightness and tone has not yet been achieved with good balance.

A mode for obtaining dark display under the state where liquid crystal molecules are aligned substantially parallel to the substrate surface, that is, NB (Normally Black) mode for obtaining black display without application of a voltage, can more easily compensate for dark display, can obtain more easily satisfactory dark display, and can therefore obtain more easily higher contrast than a mode for obtaining dark display while the liquid crystal molecules are kept upright from the substrate surface, that is, NW (Normally White) mode for obtaining white display without application of the voltage.

SUMMARY OF THE INVENTION

It is an object of the invention to provide an STN reflecting type liquid crystal display device using one polarizing plate, which allows to obtain achromatic display of high contrast and high lightness, and provide excellent visibility.

The invention provides a reflecting type liquid crystal display device of NB mode, comprising an STN type liquid crystal cell; a first phase difference plate, a second phase difference plate and a polarizing plate, the first phase difference plate, second phase difference plate and polarizing plate being disposed in this order on one surface of the STN type liquid crystal cell; and reflecting means disposed on the other surface of the STN type liquid crystal cell, wherein a product $\Delta nLC.dLC$ of birefringence $\Delta nLC$ and thickness $dLC$ of a liquid crystal layer of the liquid crystal cell is selected from a range of 660 nm to 830 nm, a product $\Delta n1.d1$ of birefringence $\Delta n1$ and thickness $d1$ of the first phase difference plate is selected from a range of 120 nm to 240 nm, and a produce $\Delta n2.d2$ of birefringence $\Delta n2$ and thickness $d2$ of the second phase difference plate is selected from a range of 300 nm to 430 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, and angle θ from a major axis of the first phase difference plate side liquid crystal molecules of the liquid crystal layer of the liquid crystal cell to a slow axis of the first phase difference plate is selected from a range of −130° to −75°, an angle φ from the slow axis of the first phase difference plate to a slow axis of the second phase difference plate is selected from a range of −20° to −60°, and an angle φ from the slow axis of the second phase difference plate to an absorption axis of the polarizing plate is selected from a range of −15° to −45°.

According to the invention, incident ambient light is converted to linearly polarized light by the polarizing plate, then to elliptically polarized light by the second and first phase difference plates, are modulated by the liquid crystal layer of the STN type liquid crystal cell, and are reflected by the reflecting means. The travel of reflected light is the reverse of the incident light, namely, reflected light outgoes after being modulated, and is observed. In the STN type reflecting type liquid crystal display device of the NB mode using one polarizing plate, the characteristics and design conditions of the optical members such as the polarizing plate, the first and second phase difference plates and the liquid crystal layer are optimized. In other words, the retardation ΔnLC.dLC of the liquid crystal layer, the retardation Δn1.d1 of the first phase difference plate, the retardation Δn2.d2 of the second phase difference plate, the twist angle χ, the angle θ, the angle φ and the angle φ are optimized as described above. In consequence, high contrast and high lightness can be obtained while achromatic black display is maintained, and excellent visibility can be obtained.

Furthermore, the invention provides a reflecting type liquid crystal display device of NB mode, comprising an STN type liquid crystal cell; a first phase difference plate, a second phase difference plate and a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC.dLC of birefringence ΔnLC and thickness dLC of a liquid crystal layer of the liquid crystal cell is selected from a range of 750 nm to 850 nm, a product Δn1.d1 of birefringence Δn1 and thickness d1 of the first phase difference plate is selected from a range of 150 nm to 250 nm, and a product Δn2.d2 of birefringence Δn2 and thickness d2 of the second phase difference plate is selected from a range of 630 nm to 730 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −145° to −110°, an angle φ from the slow axis of the first phase difference plate to a slow axis of the second phase difference plate is selected from a range of −25° to −60°, and an angle φ from the slow axis of the second phase difference plate to an absorption axis of the polarizing plate is selected from a range of +10° to +40°.

According to the invention, high contrast and high lightness can be obtained while achromatic black display is maintained, by optimizing the retardation ΔnLC.dLC of the liquid crystal layer, the retardation Δn1.d1 of the first phase difference plate, the retardation Δn2.d2 of the second phase difference plate, the twist angle χ, the angle θ, the angle φ and the angle φ as described above. The color at the time of non-application of a voltage (background color) is approximate to pure black. Furthermore, matching with a three-dimensional phase difference plate can be improved and broad visual field angle can be acquired.

Furthermore the invention provides a reflecting type liquid crystal display device of NB mode, comprising an STN type liquid crystal cell; a first phase difference plate, a second phase difference plate and a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC.dLC of birefringence ΔnLC and thickness dLC of a liquid crystal layer of the liquid crystal cell is selected from a range of 800 nm to 900 nm, a produce of Δn1.d1 of birefringence Δn1 and thickness d1 of the first phase difference plate is selected from a range of 430 nm to 530 nm, and a product Δn2.d2 of birefringence Δn2 and thickness d2 of the second phase difference plate is selected from a range of 630 nm to 730 nm, and wherein in the case where a twist direction of a major axis of liquid crystal molecules of the light crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −50° to −90°, an angle φ from the slow axis of the first phase difference plate to a slow axis of the second phase difference plate is selected from a range of −40° to −80°, and an angle φ from the slow axis of the second phase difference plate to an absorption axis of the polarizing plate is selected from a range of +10° to +40°.

According to the invention, high contrast and high lightness can be obtained while achromatic black display is maintained, by optimizing the retardation ΔnLC.dLC of the liquid crystal layer, the retardation Δn1.d1 of the first phase difference plate, the retardation Δn2.d2 of the second phase difference plate, the twist angle χ, the angle θ, the angle φ and the angle φ as described above.

Moreover the invention provides a reflecting type liquid crystal display device of NB mode, comprising an STN type liquid crystal cell; a first phase difference plate, a second phase difference plate and a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC.dLC of birefringence ΔnLC and thickness dLC of a liquid crystal layer of the liquid crystal cell is selected from a range of 820 nm to 920 nm, a product of Δn1.d1 of birefringence Δn1 and a thickness d1 of the first phase difference plate is selected from a range of 470 nm to 570 nm, and a product Δn2.d2 of birefringence Δn2 and thickness d2 of the second phase difference plate is selected from a range of 350 nm to 450 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −70° to −110°, an angle φ from the slow axis of the first phase difference plate to a slow axis of the second phase difference plate is selected from a range of −40° to −80°, and an angle 100 from the slow axis of the second phase difference plate to an absorption axis of the polarizing plate is selected from a range of −10° to −40°.

According to the invention, high contrast and high lightness can be obtained while achromatic black display is maintained, by optimizing the retardation ΔnLC.dLC of the liquid crystal layer, the retardation Δn1.d1 of the first phase difference plate, the retardation Δn2.d2 of the second phase difference plate, the twist angle χ, the angle θ, the angle φ and the angle φ as described above.

Furthermore the invention provides a reflecting type liquid crystal display device of NB mode, comprising an STN type liquid crystal cell; a first phase difference plate, a second phase difference plate and a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC.dLC of birefringence ΔnLC and thickness dLC of a liquid crystal layer of the liquid crystal cell is selected from a range of 870 nm to 970 nm, a product Δn1.d1 of birefringence Δn1 and a thickness d1 of the first phase difference plate is selected from a range of 50 nm to 150 nm, and a product Δn2.d2 of birefringence Δn2 and thickness d2 of the second phase difference plate is selected from a range of 600 nm to 800 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −60° to −105°, an angle φ from the slow axis of the first phase difference plate to a slow axis of the second phase difference plate is selected from a range of −10° to −40°, and an angle φ from the slow axis of the second phase difference plate to an absorption axis of the polarizing plate is selected from a range of −15° to −40°.

According to the invention, high contrast and high lightness can be obtained while achromatic black display is maintained, by optimizing the retardation ΔnLC.dLC of the liquid crystal layer, the retardation Δn1.d1 of the first phase difference plate, the retardation Δn2.d2 of the second phase difference plate, the twist angle χ, the angle θ, the angle φ and the angle φ as described above.

In the invention described above, the first and second phase difference plates are laminated so that the slow axes thereof form with each other an angle within 90° in a direction opposite to the twist direction of the liquid crystal molecules of the liquid crystal layer. In other words, the slow axis of the second phase difference plate is set to an angle within 90° in a direction opposite to the twist direction from the major axis direction of the reflecting means side liquid crystal molecules of the liquid crystal layer of the liquid crystal cell to the major axis direction of the first phase difference plate side liquid crystal molecules of the liquid crystal layer, as viewed from the slow axis of the first phase difference plate. In this way, a compensation function for rotatory polarization of light can be provided.

A plurality of phase difference plates can be disposed. However, the increase of parameters makes it difficult to optimize contrast, lightness and color, and invites the increase of the cost of production. Therefore, two phase difference plates are preferably disposed as in the invention described above. Incidentally, though one phase difference plate can compensate for birefringence, it cannot compensate for rotatory polarization.

In the invention described above, the product ΔnLC.dLC of the liquid crystal layer is set to at least 600 nm. When the product ΔnLC.dLC of the liquid crystal layer is smaller than 600 nm, the change amount of the birefringence phase difference when a voltage is applied, is small and sufficient lightness cannot be obtained. Even though satisfactory black display can be obtained, white display with high lightness cannot be made.

The first and second phase difference plates may be each a uniaxial oriented film.

The reflecting means may be disposed inside the liquid crystal cell. The incident light passes through the polarizing plate, the second phase difference plate, the first phase difference plate and the STN type liquid crystal cell in this order and is reflected by the reflecting means. The reflected light travels in a direction opposite to that of the incident light, and outgoes. Since the liquid crystal cell is constituted by sandwiching the liquid crystal layer by a pair of light transmitting substrates, the incident light passes through the light transmitting substrate and reaches the reflecting means when the reflecting means is disposed outside the liquid crystal cell. The reflected light passes through the light transmitting substrate and reaches the liquid crystal layer. Therefore, the reflection factor drops due to the light transmitting substrate. Parallax occurs also depending on the thickness of the light transmitting substrate. Because the reflecting means is disposed inside the liquid cell in the invention, however, the drop of the reflection factor due to the light transmitting substrate does not occur, and parallax resulting from the thickness of the light transmitting substrate can be eliminated.

The reflecting type liquid crystal display device described above comprises light scattering means disposed on a surface of the liquid crystal cell on the first phase difference plate side, and the reflecting means described above may be mirror surface reflecting means. The incident light passes through the polarizing plate, the second phase difference plate, the first phase difference plate, the light scattering means and the STN type liquid crystal cell in this order and is reflected by the mirror surface reflecting means. The reflected light travels in reverse to outgo. The light scattering means disposed on the surface of the liquid crystal cell on the side of the first phase difference plate can scatter appropriately the normal reflection components of the reflected light by the mirror surface reflecting means in the direction of the visual field angle. In consequence, apparent lightness can be improved.

In the invention it is preferable that when the refractive indices of the second phase difference plate in the in-plane direction are ns and nf and the refractive index in the thickness-wise direction is nz, a relationship of ns>nz>nf or nz>ns>nf is satisfied.

According to the invention, the visual field angle characteristics with good balance can be obtained by using the second phase difference plate which satisfies the relationship of the refractive indices ns, nf and nz as described above.

In the invention it is preferable that when the refractive index of the second phase difference plate in the direction of the slow axis is ns, the refractive index in the direction of the fast axis is nf and the refractive index in the thickness-wise direction is nz, and as a parameter representing a magnitude of biaxial refraction is defined a coefficient Z as follows:

$$Z=(ns-nz)/(ns-nf),$$

the coefficient Z is selected from a range of −0.1 to 0.5.

The invention introduces the coefficient Z defined above and selects it from the range of −0.1 to 0.5. Therefore, the invention can reliably obtain the visual field angle characteristics with good balance. While the uniaxially oriented two-dimensional phase difference plate compensates for the light incident from the vertical direction to the liquid crystal layer, the three-dimensional phase difference plate having such characteristics can compensate also for the light incident to the liquid crystal layer from oblique directions. Therefore, dependence of the incidence angle can be decreased and the visual field angle characteristics can be improved.

In the invention it is preferable that the reflecting type liquid crystal display device further comprises circularly polarized light selective irradiation means for selectively irradiating the circularly polarized light to the reflecting means from the side opposite to the liquid crystal cell of the reflecting means, and the reflecting means has a function of transmitting a part of light.

Circularly polarized light selected by the circularly polarized light selective irradiation means passes through the translucent type reflecting means, is modulated by the liquid crystal cell, is polarized to linearly polarized light or to elliptically polarized light by the first or second phase difference plate, and is absorbed by the polarizing plate, or a part of the light passes through the polarizing plate. Transmission type display can be accomplished by disposing a back-light, for example, besides the reflecting type display described above, and display can be made even when ambient light is weak or when it does not exist. Incidentally, the light incident from the side of the reflecting means passes only once through the liquid crystal layer and outgoes in the transmission type display. Therefore, circularly polarized light may be allowed to be incident in this case.

When the circularly polarized light selective irradiation means comprises a λ/4 plate and a polarizing plate, the incident light is polarized to linearly polarized light by the polarizing plate constituting the circularly polarized selective irradiation means and, in the same way, to circularly polarized light by the λ/4 plate constituting the circularly polarized selective irradiation means. Respective polarized light passes through the translucent type reflecting means, is modulated by the liquid crystal cell, is then converted to linearly polarized light or elliptically polarized light by the first or second phase difference plate, and is absorbed by the polarizing plate, or a part of light passes through the polarizing plate. In this way, display of the reflecting type and the transmission type can be accomplished.

When the circularly polarized light selective irradiation means comprises a cholesteric film, the cholesteric film constituting the circularly polarized light selective irradiation means selects right-turn light and left-turn light, In consequence, the incident light is converted to circularly polarized light, passes through the translucent reflecting means, is modulated by the liquid crystal cell, is then converted to linearly polarized light or elliptically polarized light by the first or second phase difference plate, and is absorbed by the polarizing plate, or a part of light passes through the polarizing plate. In this way, display of the reflecting type and the transmission type can be accomplished.

In the invention it is preferable that the liquid crystal cell is fabricated by sandwiching the liquid crystal layer between a pair of substrates, and plastic substrates are used as the substrates.

When the plastic substrate is used, for example, the invention makes it possible to reduce the weight of the liquid crystal display device and to improve its impact resistance.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
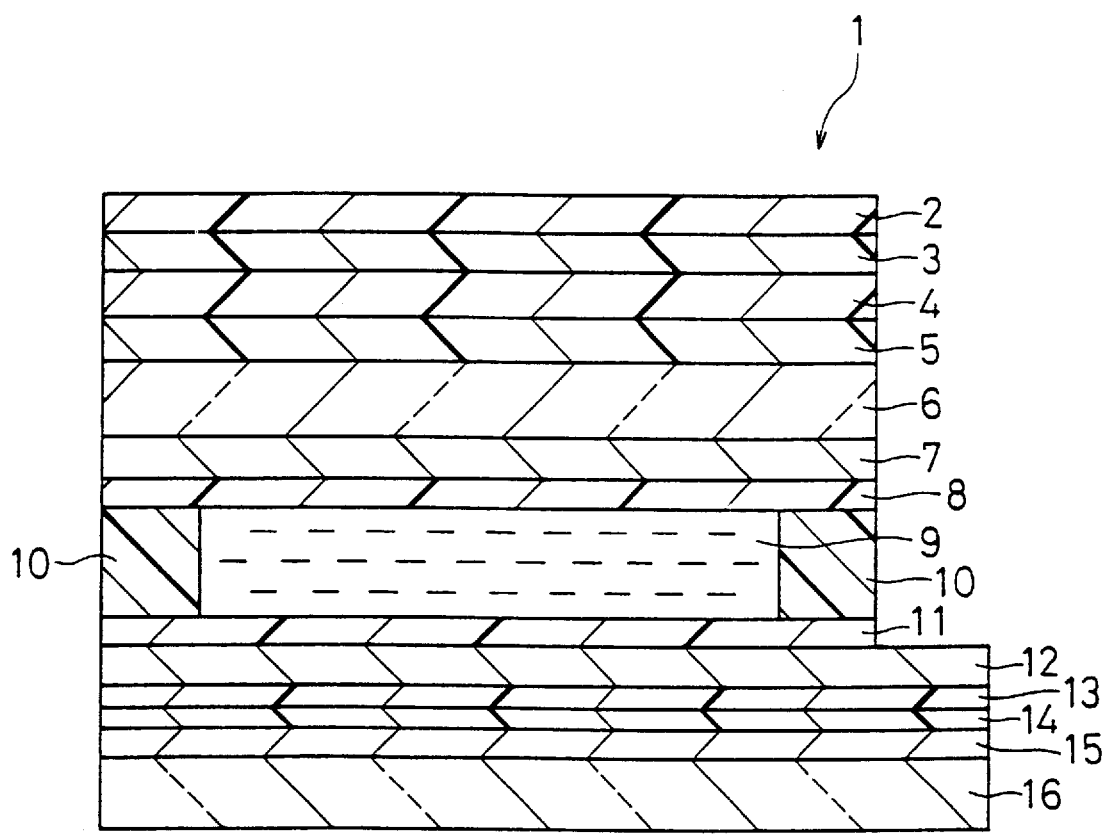
FIG. 1 is a sectional view showing a reflecting type liquid crystal display device 1 according to one embodiment of the invention.

Now referring to the drawings, preferred embodiments of the invention are described below.

FIG. 1 is a sectional view showing a reflecting type liquid crystal display device 1 according to an embodiment of the invention. The reflecting type liquid crystal display device based on the invention operates in the NB mode, and comprises an STN type liquid crystal cell, a first phase difference plate, a second phase difference plate, a polarizing plate and reflecting means. The first phase difference plate, the second phase difference plate and the polarizing plate are serially disposed on one of the surface sides of the STN liquid crystal cell. The reflecting means may be disposed on the other surface side of the liquid crystal cell or inside the liquid crystal cell.

The liquid crystal cell of the liquid crystal display device 1 comprises light transmitting substrates 6 and 16, transparent electrodes 7 and 12, orientation films 8 and 11, a liquid crystal layer 9, a sealant 10, an overcoat layer 13, a color filter 14 and a reflecting layer 15. In other words, the reflecting layer 15 is disposed as the reflecting means inside the liquid crystal cell of the liquid crystal display device 1. The liquid crystal display device 1 comprises such a liquid crystal cell, and a light scattering plate 5, a first phase difference plate 4, a second phase difference plate 3 and a polarizing plate 2 which are disposed in this order on one of the surface sides of the liquid crystal cell.

The reflecting layer 15 is disposed on one of the surface sides of the light transmitting substrate 16 made of glass, for example. The reflecting layer 15 is formed by, for example, vacuum depositing aluminum. The color filter 14 is disposed on the reflecting layer 15. The color filter 14 is formed into a stripe shape of R (red), B (blue) and G (green) by electro-deposition, for example. The overcoat layer 13 is disposed on the color filter 14. The surface of the color filter 14 is uneven due to the overlapping portions of the filter of each color and due to the difference of the film thickness of the filter of each color with the result of the drop of the orientation property of the liquid crystal molecules. The overcoat layer 13 is disposed to prevent such a drawback. The overcoat layer 13 is formed of an acrylic resin, for example.

The transparent electrodes 7 and 12 are disposed on one of the surfaces of the light transmitting substrate 6 made of glass, for example, and on the overcoat layer 13, respectively. The transparent electrodes 7 and 12 are formed by, for example, depositing ITO (indium tin oxide) and etching it into matrix. After the transparent electrodes 7 and 12 are formed on the substrate, the orientation film 8 and 11 are so disposed as to cover the transparent electrodes 7 and 12, respectively. The orientation films 8 and 11 are formed by, for example, coating polyimide by printing, baking it, and conducting orientation treatment such as rubbing. This orientation treatment is conducted so that the twist angle $\chi$ of the liquid crystal molecules of the liquid crystal layer sandwiched between the orientation films 8 and 11 describes a predetermined angle within the range of 220° to 260° such as 240°.

After the process steps till the formation of the orientation films 8 and 11 are completed, the light transmitting substrate 6 and 16 are bonded around the periphery thereof by the sealant 10 while each orientation film 8, 11 faces inward and a predetermined gap is secured between the substrates. The gap, shown as dLC, is the thickness of liquid crystal layer 9. The liquid crystal to be charged is adjusted to a predetermined birefringence $\Delta nLC$ and a predetermined pitch. The liquid crystal cell fabricated in this way is the STN type of the NB mode.

The light scattering plate 5 is bonded to the surface of the light transmitting substrate 6 opposite to the liquid crystal layer 9. The light scattering plate 5 is disposed on the side where the light of the liquid crystal cell is observed, that is, on the front side, and has the function of limiting the scattering directions of the light due to scattering. Therefore, the light outgoes not only in the normal reflecting direction but also in other directions, and display becomes apparently brighter. Incidentally, the light scattering plate 5 does not disturb polarization, and the contrast does not drop. Because display becomes vague due to parallax, however, the light scattering plate 5 is disposed preferably in the proximity of the reflecting layer 15 as the reflecting means.

The first phase difference plate 4, the second phase difference plate 3 and the polarizing plate 2 are bonded in this order into the light scattering plate 5. The first phase difference plate 4 has predetermined $\Delta n1 \cdot d1$ and the second phase difference plate 3 has predetermined $\Delta n2 \cdot d2$. Here, $\Delta n1$ and $\Delta n2$ represent the birefringences of the phase difference plates 4 and 3, respectively. Symbols d1 and d2 represent the thickness of the phase difference plates 4 and 3, respectively. Each phase difference plate 4, 3 is realized by, e. g. stretched polycarbonate and can be accomplished by an economical uniaxial oriented film. The phase difference plate 3 may be formed by a three-dimensional phase difference film. The polarizing plate 2 is accomplished by a neutral gray polarizing plate.

Incidentally, the color filter 14 and the overcoat layer 13 are disposed on the side of the light transmitting substrate 16 in the liquid crystal display device 1 of this embodiment. However, the color film 14 and the overcoat layer 13 may be disposed on the side of the light transmitting substrate 6. In this case, it is possible to constitute the transparent electrode 12 by a metal electrode having a light reflecting function and to omit the reflecting layer 15.

The transparent electrodes 7 and 12 are pixel electrodes, and a black matrix comprising a light absorbing material may be formed round the transparent electrodes 7 and 12. In this way, light interception performance can be improved during black display, and con contribute to the improvement of the contrast.

A similar effect can be obtained by disposing the light scattering layer inside the liquid crystal, or by providing the reflecting layer 15 with a light diffusing function.

In this embodiment, the glass substrate is used for the light transmitting substrates 6 and 16, but the liquid crystal display device may be constituted by using a plastic substrate. The liquid crystal display device can be made light in weight by using the plastic substrate, and its impact resistance can be improved.

Figure 2:
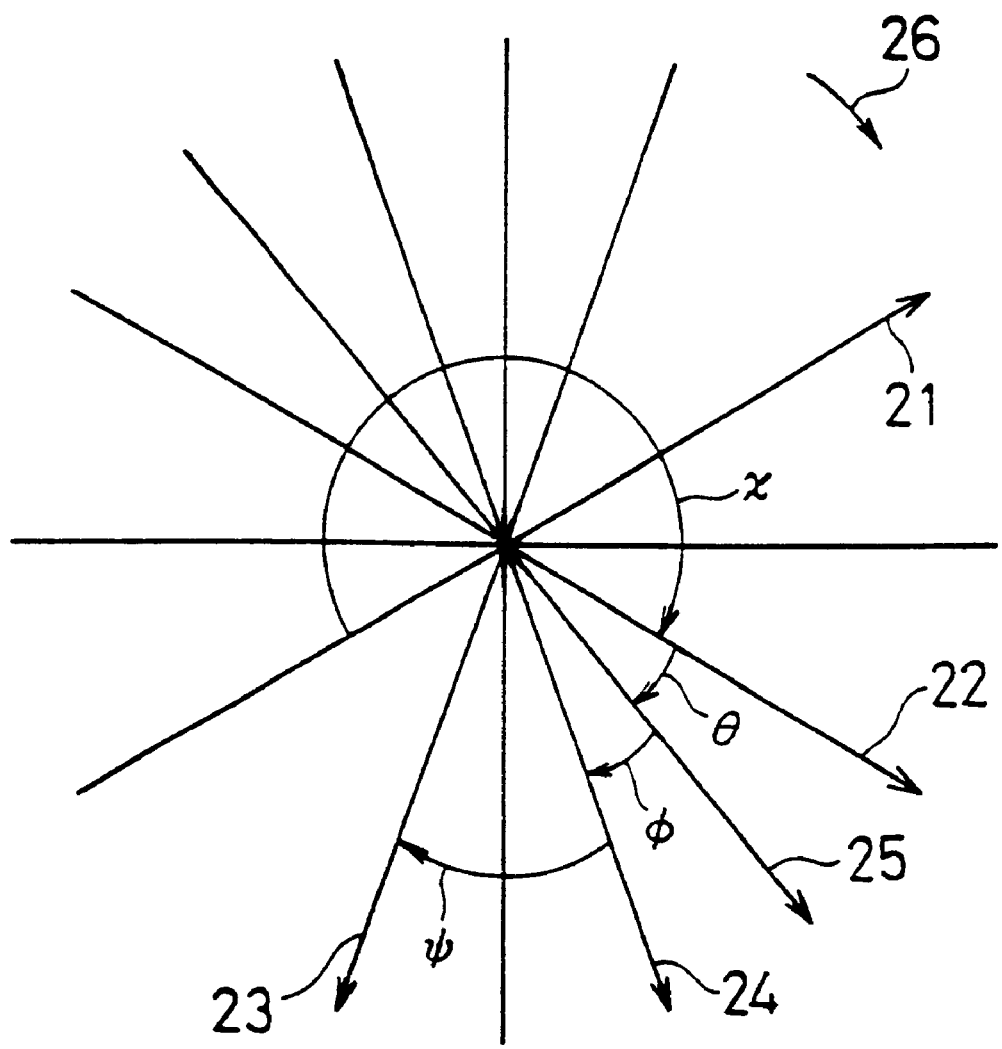
FIG. 2 is an explanatory view useful for explaining the positional relationship of each optical member of the liquid crystal display device 1.

FIG. 2 is an explanatory view useful for explaining the positional relationship of each optical member of the liquid crystal display device. Here, the term "each optical member" represents the polarizing plate 2, the second phase difference plate 3, the first phase difference plate 4 and the liquid crystal layer 9. Arrow 21 represents orienting direction of the orientation film 11 side liquid crystal molecules of liquid crystal layer 9. Arrow 22 represents orienting direction of the orientation film 8 side liquid crystal molecules of the liquid crystal layer 9. Arrow 23 represents the absorption axis of the polarizing plate 2. Arrow 24 represents the slow axis of the second phase difference plate 3. Arrow 25 represents the slow axis of the first phase difference plate 4.

An angle χ represents an angle from the orienting direction 21 of the orientation film 11 side liquid crystal molecules of the liquid crystal layer 9 to the orienting direction 22 of the orientation film 8 side liquid crystal molecules of the liquid crystal layer 9. In other words, it represents the twist angle of the liquid crystal molecules from the orientation film 11 to the orientation film 8. An angle θ represents an angle from the orienting direction 22 of the orientation film 8 side liquid crystal molecules of the liquid crystal layer 9 to the slow axis 25 of the first phase difference plate 4. An angle 100 represents an angle from the slow axis 25 of the first phase difference plate 4 to the slow axis 24 of the second phase difference plate 3. An angle ψ is an angle from the slow axis 24 of the second phase difference plate 3 to the absorption axis 23 of the polarizing plate 2.

The parameters of the optical members of the liquid crystal display device 1 are ΔnLC·dLC, Δn1·d1, Δn2·d2, the angle χ, the angle θ, the angle φ and the angle ψ. These parameters are set appropriately. Incidentally, each angle is represented when the twist angle direction of the liquid crystal molecules from the orientation film 11 to the orientation film 8 is set to the positive direction 26.

Figure 3:
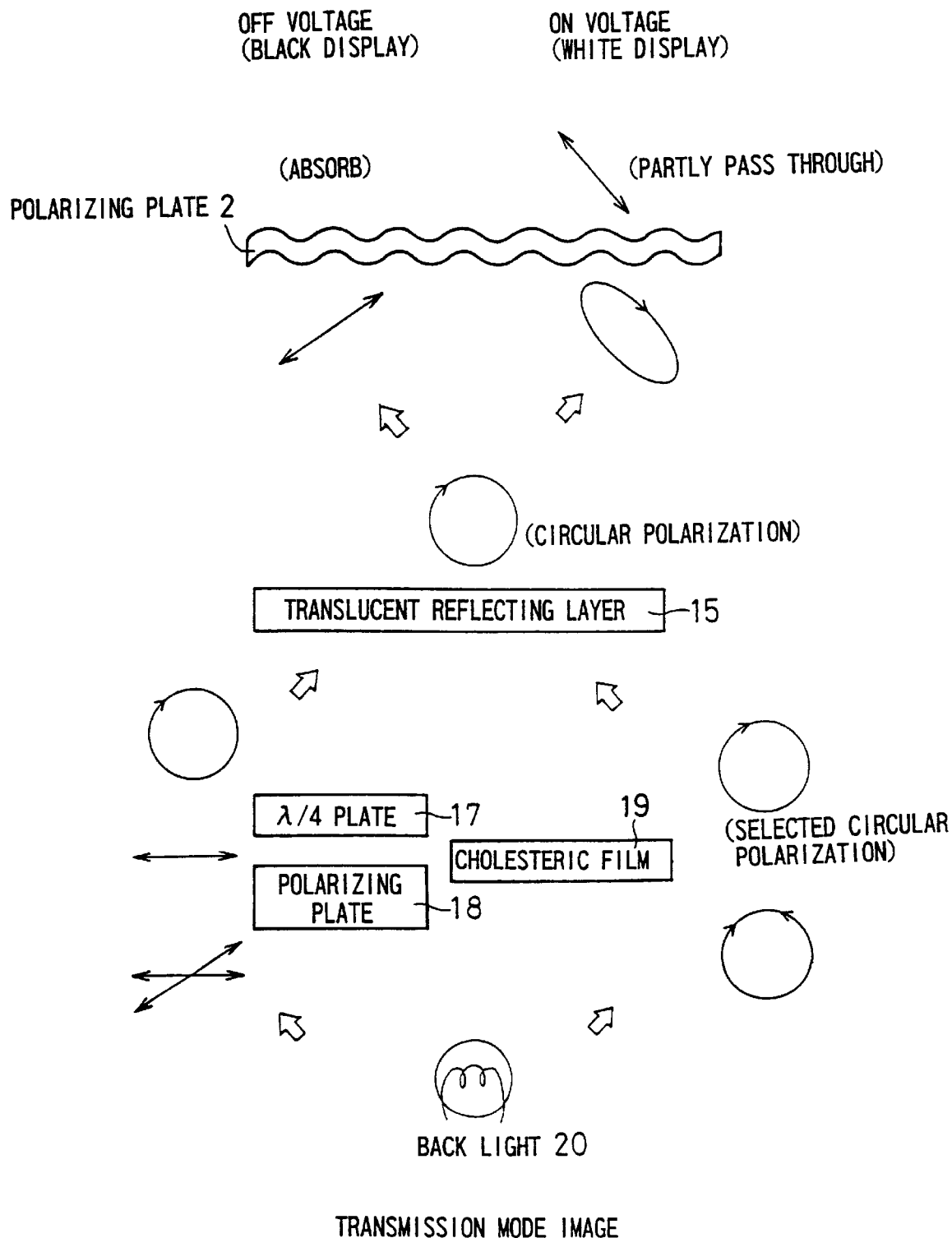
FIG. 3 is an explanatory view useful for explaining the display principle of a translucent type liquid crystal display device according to another embodiment of the invention.

FIG. 3 is an explanatory view useful for explaining the principle of display of a translucent type liquid crystal display device according to another embodiment of the invention. The translucent type liquid crystal display device includes circularly polarized light selective irradiation means for selectively irradiating circularly polarized light towards the reflecting means on the opposite side to the liquid cell of the reflecting means in the reflecting type liquid crystal display device described above. The reflecting means has the function of transmitting a part of light. In the case of the liquid crystal display device 1, the circularly polarized light selective irradiation means is disposed on the opposite side to the liquid crystal layer 9 of the light transmitting substrate 16, and the reflecting layer 15 transmits a part of light.

More concretely, the circularly polarized light selective irradiation means comprises a λ/4 plate 17 and a polarizing plate 18 which are disposed in this order on the light transmitting substrate 16. The circularly polarized light selective irridation means comprises a cholesteric film 19 formed on the light transmitting substrate 16.

Circularly polarized light, which is irradiation light from the back-light 20, for example, on the opposite side to the liquid crystal cell of the circularly polarized selective irradiation means and is selected by the circularly polarized light selective irradiation means, passes through the translucent reflecting layer 15 and is converted to circularly polarized light. This circularly polarized light is modulated by the liquid crystal cell at the time of the application of the off voltage (at the time of black display), is converted to linearly polarized light by the first and second phase difference plates 4 and 3, and is thereafter absorbed by the polarizing plate 2. When the on voltage is applied (at the time of white display), the other hand, circularly polarized light is modulated by the liquid crystal cell, is converted to elliptically polarized light by the first and second phase difference plates 4 and 3, and thereafter passes partly through the polarizing plate 2.

The rotating direction of circularly polarized light selected at this time by the circularly polarized light selective irradiation means must be set so that the light incident from the side of the polarizing plate 2 at the time of the application of the off voltage (at the time of black display) is reflected by the reflecting layer 15 and then travels in the same direction as the rotating direction. In this way, the light incident from the polarizing plate 2 side at the time of the application of the off voltage (at the time of black display) and reflected by the reflecting layer 15 and the light incident from the side of the polarizing plate 18 and passing through the reflecting layer 15 are both absorbed by the polarizing plate 2, and black display can be made stably.

In the way described above, not only reflecting type display but also transmission type display can be accomplished, and display can be made even when ambient light is weak.

When the circularly polarized light selective irradiation means comprises the λ/4 plate 17 and the polarizing plate 18, incident light is converted to linearly polarized light by the polarizing plate 18 and to circularly polarized light by the λ/4 plate 17. When the circularly polarized light selective irradiation means comprises the cholesteric film 19, incident light becomes circularly polarized light as the cholesteric film 19 selects right-turn light and left-turn light.

Hereinafter, the liquid crystal display device according to the invention will be explained with reference to Examples.

Comparative Example 1

In Comparative Example 1, the aforementioned parameters are set as follows. It has been confirmed that achromatic display can be made in the NB mode.

| | |
|---|---|
| ΔnLC · dLC: | 600 nm to 650 nm |
| Δn1 · d1: | 120 nm to 200 nm |
| Δn2 · d2: | 300 nm to 470 nm |
| twist angle χ: | 220° to 260° |
| angle θ: | −110° to −85° |
| angle φ: | −30° to −50° |
| angle ψ: | −30° to −15° |

It has been confirmed that particularly when these parameters are set as listed below, achromatic display can be accomplished with good balance of high contrast and high lightness:

ΔnLC·dLC=650 nm,

Δn1·d1=160 nm,

Δn2·d2=380 nm, twist angle χ=240°, angle θ=−105°, angle φ=−30°, and angle ψ=−20°.

When simple matrix driving at a 1/240 duty and 1/13 bias is conducted by irradiating diffused light, a contrast of 6 and a reflection factor of 8.5% were obtained at the display characteristics immediately above the display surface. Chromaticity of white (x, y)=(0.294, 0.319) and black (x, y)=(0.296, 0.291) is obtained on the chromaticity coordinates in an X-Y-Z display system. It has thus been confirmed that achromatic display relatively approximate to the white color point (x, y)=(0.310, 0.316) as the reference can be accomplished. In parameter setting of Comparative Example 1, however, ΔnLC·dLC is small, and the change of the birefrigence phase difference at the time of the application of the voltage is small. Therefore, lightness is low, although achromatic black-and-white display can be obtained.

Incidentally, the contrast is measured in the following way. Diffused light is used as a light source. A reflection factor of reflected light within the range of a visual field angle of 2° from a light irradiation region having a 10 mm diameter is measured. LON represents the reflection factor at the time of the on voltage and LOFF represents the reflection factor at the time of the off voltage. The maximum value of LON/LOFF is defined as the contrast. The tone is evaluated for reflected light similar to the one described above by a CIE chromaticity space. Retardation of the first and second phase difference plates 4 and 3 and the liquid crystal layer, that is $\Delta n1 \cdot d1$ and $\Delta n2 \cdot d2$, is measured by a rotary analyzer method. Particularly, retardation of the liquid crystal layer is measured under the state where no voltage is applied. The measurement is made in the same way in the following examples, too.

EXAMPLE 1

In Example 1, the parameters are set as listed below. It has been confirmed that achromatic display can be obtained with high contrast and high lightness in simple matrix driving. It has been confirmed also that display having sufficiently high lightness and high contrast can be obtained even in the case of the transmission type using a half mirror or a perforated reflecting plate as the translucent reflecting means, and circularly polarized light is allowed to be incident from the back.

| | |
|---|---|
| $\Delta nLC \cdot dLC$: | 660 nm to 830 nm |
| $\Delta n1 \cdot d1$: | 120 nm to 240 nm |
| $\Delta n2 \cdot d2$: | 300 nm to 430 nm |
| twist angle $\chi$: | 220° to 260° |
| angle $\theta$: | −130° to −75° |
| angle $\phi$: | −20° to −60° |
| angle $\psi$: | −15° to −45° |

It has been confirmed that achromatic display can be accomplished with good balance of high contrast and high lightness particularly when the parameters are set as follows.

Figure 4:
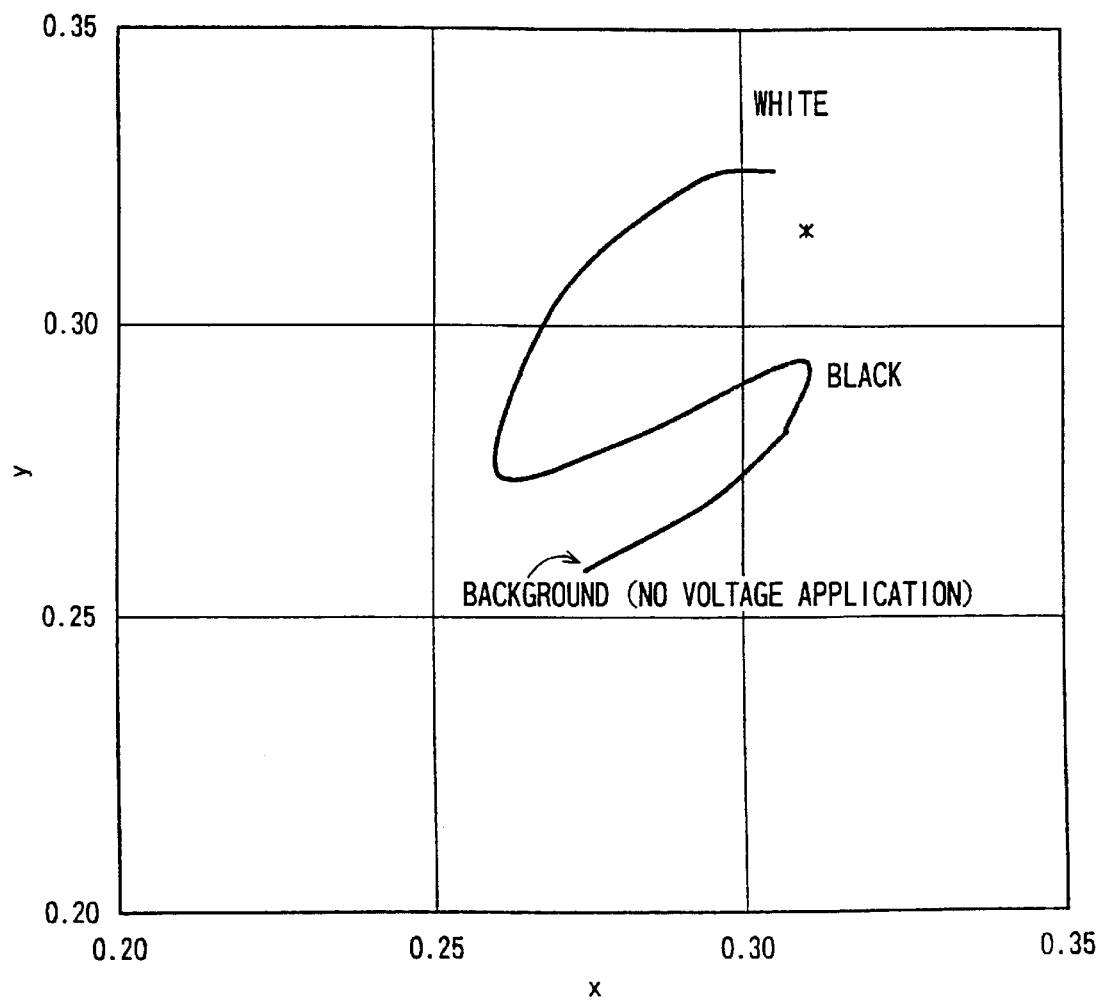
FIG. 4 is a graph showing a chromaticity change in the embodiment 1.

$\Delta nLC \cdot dLC = 750$ nm, $\Delta n1 \cdot d1 = 200$ nm, $\Delta n2 \cdot d2 = 350$ nm, twist angle $\chi = 240°$, angle $\theta = -120°$, angle $\phi = -40°$ and angle $\psi = -25°$ When simple matrix driving is conducted under the same condition as that of Comparative Example 1, a contrast of 7 and a reflection factor of 10% can be obtained as display characteristics immediately above the display surface. Furthermore, white (x, y)=(0.305, 0.326) and black (x, y)=(0.309, 0.294) were obtained on the chromaticity coordinates in the X-Y-Z display color system, and achromatic display very approximate to the white color point can be accomplished. It has further been confirmed that this display is achromatic sufficient for practical application even in intermediate colors. The change of chromaticity with the voltage change during voltage driving is evaluated. The result is shown in FIG. 4. Color characteristics when no voltage is applied are tabulated in Table 1.

TABLE 1

Color characteristics in Examples 1 and 2 when no voltage is applied

| | x | y |
|---|---|---|
| Example 1 | 0.274 | 0.258 |
| Example 2 | 0.292 | 0.273 |

A contrast of 18 and a transmission factor of 1.7% were obtained in the transmission type mode when a half mirror is used as the translucent reflecting means and circularly polarized light is allowed to be incident from the back. It has thus been confirmed that achromatic display can be obtained with high contrast and high transmission factor.

EXAMPLE 2

It has been confirmed that when the parameters are set as listed below in Example 2, achromatic display can be obtained in simple matrix driving with high contrast and high lightness. It has also been confirmed that display can be obtained with sufficient lightness and high contrast even in the transmission type in which a half mirror or a perforated plate is used as the translucent reflecting means and circularly polarized light is allowed to be incident from the back.

| | |
|---|---|
| $\Delta nLC \cdot dLC$: | 750 nm to 850 nm, |
| $\Delta n1 \cdot d1$: | 150 nm to 250 nm |
| $\Delta n2 \cdot d2$: | 630 nm to 730 nm |
| twist angle $\chi$: | 220° to 260° |
| angle $\theta$: | −145° to −110° |
| angle $\phi$: | −25° to −60° |
| angle $\psi$: | +10° to +40° |

It has been confirmed that achromatic display can be accomplished with good balance of high contrast and high lightness particularly when the parameters are set as follows:

$\Delta nLC \cdot dLC = 800$ nm, $\Delta n1 \cdot d1 = 180$ nm, $\Delta n2 \cdot d2 = 680$ nm, twist angle $\chi = 240°$, angle $\theta = -120°$, angle $\phi = -40°$, and angle $\psi = +15°$.

Figure 5:
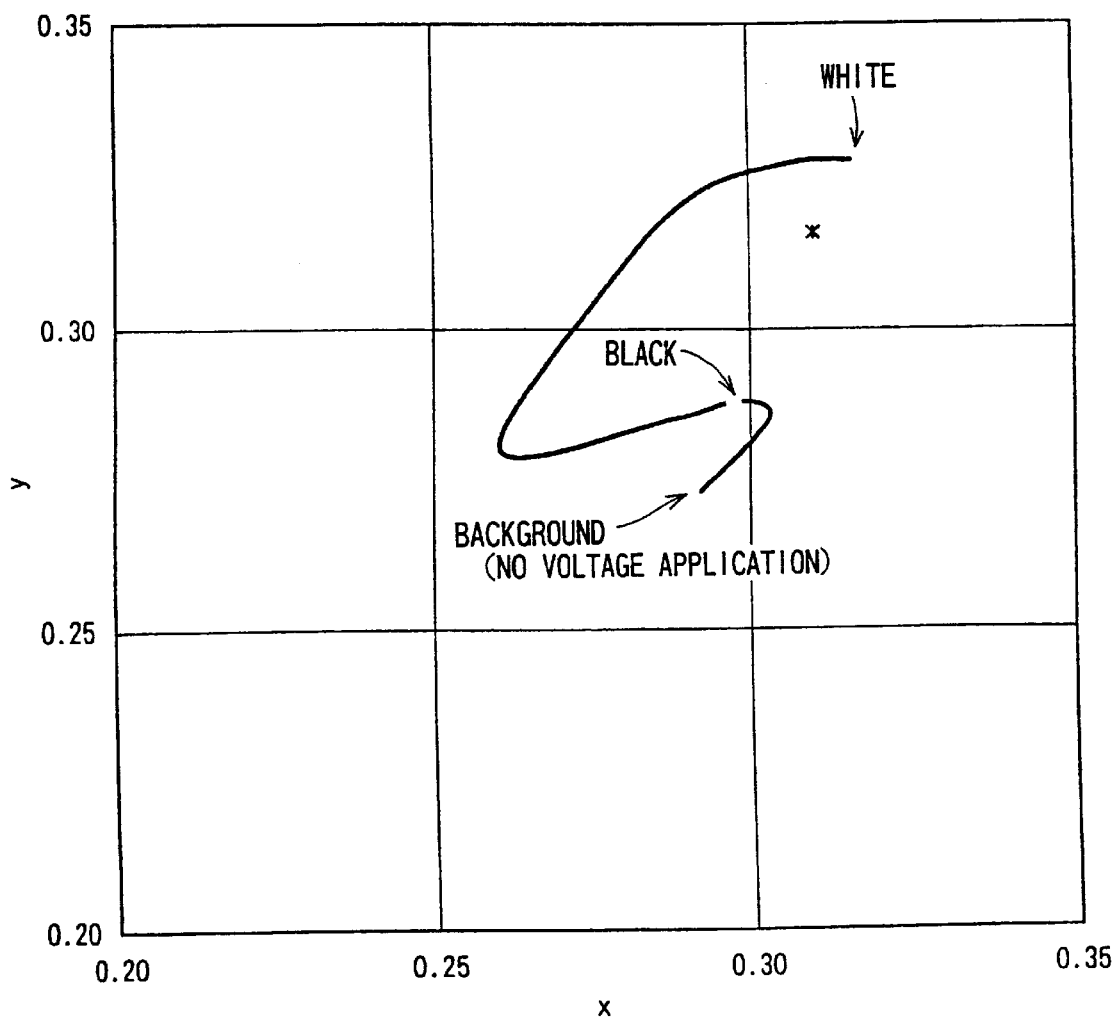
FIG. 5 is a graph showing a chromaticity change in the embodiment 2.

When simple matrix driving is carried out under the same condition as that of Comparative Example 1, a contrast of 7 and a reflection factor of 10% were obtained as display characteristics immediately above the display surface. Furthermore, white (x, y)=(0.316, 0.328) and black (x, y)=(0.298, 0.288) are obtained on the chromaticity coordinates in the X-Y-Z display color system. Achromatic display approximate to the white color point can be accomplished in this way. It has thus been confirmed that the color is achromatic sufficient for practical application. The chromaticity change resulting from the voltage change in voltage driving is evaluated. The result is shown in FIG. 5. Color characteristics when no voltage is applied are tabulated in Table 1. In comparison with Example 1, the color when no application of the voltage (background color) comes closer to the color at the time of black display in Example 2. Therefore, even when the power source is cut off in the display device, the display screen becomes black without the feeling of incompatibility. In this way, the display characteristics desirable for practical application can be obtained.

A contrast of 18 and a transmission factor of 1.7% were obtained in the transmission type mode in the translucent type in the same way as in Example 1. It has thus been confirmed that achromatic display can be obtained with high contrast and high transmission factors.

EXAMPLE 3

In this Example 3, the parameters are set as listed below. It has been confirmed that achromatic display can be obtained in simple matrix driving with good balance of high contrast and high lightness. It has been confirmed also that sufficient bright and high-contrast display can be obtained even in the transmission type where a half mirror or a perforated plate is used as the translucent reflecting means and circularly polarized light is allowed to be incident from the back.

| | |
|---|---|
| ΔnLC · dLC: | 800 nm to 900 nm |
| Δn1 · d1: | 430 nm to 530 nm |
| Δn2 · d2: | 630 nm to 730 nm |
| twist angle χ: | 220° to 260° |
| angle θ: | −50° to −90° |
| angle φ: | −40° to −80° |
| angle ψ: | +10° to +40° |

Because ΔnLC·dLC is relatively great, the balance at the time of cut-off of black collapses and the contrast drops to a certain extent. However, the reflection factor and the transmission factor are great. Therefore, this example is suitable for the application which requires high lightness and high transmission factor.

It has been confirmed that achromatic display can be accomplished with good balance of high contrast and high lightness particularly when the parameters are set as follows:

ΔnLC·dLC=840 nm,

Δn1·d1=480 nm,

Δn2·d2=680 nm, twist angle χ: 240°, angle θ=−70°, angle φ=−60°, and angle ψ=+25°.

When simple matrix driving is carried out under the same condition as that of Comparative Example 1, a contrast of 6 and a reflection factor of 11% were obtained as the display characteristics immediately above the display surface. Furthermore, white (x, y)=(0.320, 0.332) and black (x, y)=(0.330, 0.308) are obtained on the chromaticity coordinates in the X-Y-Z display color system and an achromatic color approximate to the white color point can be accomplished. It has thus been confirmed that the color is achromatic sufficient for practical application even in the intermediate color.

A contrast of 15 and a transmission factor of 2.0% were obtained in the transmission type mode in the translucent type in the same way as in Example 1. It has thus been confirmed that achromatic display can be obtained with high contrast and high transmission factor.

EXAMPLE 4

The parameters are set as listed below in this Example 4. It has been confirmed that achromatic display can be obtained with high contrast and high lightness in simple matrix driving. It has also been confirmed that sufficiently bright and high-contrast display can be obtained in the transmission type, too, where a half mirror or a perforated reflecting plate is used as the translucent reflecting means and circularly polarized light is allowed to be incident from the back.

| | |
|---|---|
| ΔnLC · dLC: | 820 nm to 920 nm |
| Δn1 · d1: | 470 nm to 570 nm |
| Δn2 · d2: | 350 nm to 450 nm |
| twist angle χ: | 220° to 260° |
| angle θ: | −70° to −110° |
| angle φ: | −40° to −80° |
| angle ψ: | −10° −40° |

Since ΔnLC·dLC is relatively great, the balance collapses when black is cut off, and the contrast drops to a certain extent. However, since the reflection factor and the transmission factor are great, this embodiment is suitable for the application which requires high lightness and high transmission factor.

It has been confirmed that particularly when the parameters are set as listed below, achromatic display can be accomplished with good balance of high contrast and high lightness:

ΔnLC·dLC=870 nm,

Δn1·d1=520 nm,

Δn2·d2=400 nm, twist angle χ=240°, angle θ=−90°, angle φ=−60°, and angle ψ=−25°.

When simple matrix driving is conducted under the same condition as that of Comparative Example 1, a contrast of 6 and a reflection factor of 11% were obtained as display characteristics immediately above the display surface. Furthermore, white (x, y)=(0.307, 0.316) and black (x, y)=(0.286, 0.284) were obtained on the chromaticity coordinates in the X-Y-Z display color system. It has thus been confirmed that an achromatic color approximate to the white color point can be accomplished and the color achromatic sufficient for practical application even in the intermediate color.

A contrast of 15 and a transmission factor of 2.0% were obtained in the transmission type mode in the translucent type similar to that of Example 1. It has thus been confirmed that achromatic display can be obtained with high contrast and high transmission factor.

EXAMPLE 5

In Example 5, the parameters are set as listed below. It has been confirmed that achromatic display can be obtained with high contrast and high lightness in simple matrix driving. It has been confirmed also that display having sufficient lightness and high contrast can be obtained even in the transmission type where a half mirror or a perforated reflecting plate is used as the translucent reflecting means and circularly polarized light is allowed to be incident from the back.

| | |
|---|---|
| ΔnLC · dLC: | 870 nm to 970 nm |
| Δn1 · d1: | 50 nm to 150 nm |
| Δn2 · d2: | 600 nm to 800 nm |
| twist angle χ: | 220° to 260° |
| angle θ: | −60° to 105° |
| angle φ: | −10° to −40° |
| angle ψ: | −15° to −40° |

Since ΔnLC·dLC is relatively great, the balance collapses when black is cut off and the contrast drops to a certain extent. However, because the reflection factor and transmission factor are great, this example is suitable for the application which requires high lightness and high transmission factor.

It has been confirmed that particularly when the parameters are set as listed below, achromatic display can be made with good balance of high contrast and high lightness:

ΔnLC·dLC=920 nm,

Δn1·d1=100 nm,

Δn2·d2=680 nm, twist angle χ=240°, angle θ=−85°, angle φ=−20°, angle ψ=−25°.

When simple matrix driving is made under the same condition as that of Comparative Example 1, a contrast of 6 and a reflection factor of 11% were obtained as the display characteristics immediately above the display surface. Furthermore, white (x, y)=(0.313, 0.333) and black (x, y)=(0.278, 0.277) were obtained on the chromaticity coordinates in the X-Y-Z display color system. It has thus been confirmed that an achromatic color approximate to the white color point can be accomplished and the color is achromatic sufficient for practical application even in the intermediate color.

A contrast of 15 and a transmission factor of 2.0% were obtained in the transmission-type mode in the translucent type similar to that of Example 1. It has thus been confirmed that achromatic display can be obtained with a high contrast and a high transmission factor.

In Examples 1 through 5, an equivalent effect can be obtained due to symmetry of the optical arrangement even when the angle φ is deviated by 90 degrees. The value ΔnLC·dLC is the value at a wavelength of 589 nm and the values Δn1·d1 and Δn2·d2 are values at a wavelength of 550 nm.

EXAMPLE 6

Examples 1 through 5 given above use a uniaxial oriented film as the second phase difference plate 3. In contrast, this Example 6 uses a three-dimensional phase difference film (a product of Nitto Denko K. K.) for the second phase difference plate 3 in Example 1. This three-dimensional phase difference film satisfies the relation ns>nz>nf or nz>ns>nf where ns and nf are the refractive indices in the in-plane direction and nz is the refractive index in the thickness-wise direction. Such a second phase difference plate 3 provides visual field angle characteristics having a good balance.

A coefficient Z given below is defined particularly as a parameter which represents the magnitude of biaxial birefringence.

$$Z=(ns-nz)/(ns-nf)$$

Here, ns is the refractive index in the slow axis direction, nf is the refractive index in the fast axis direction and nz is the refractive index in the thickness-wise direction. When Z is selected from the range of −0.1 to 0.5, visual field angle characteristics having a good balance can be obtained reliably.

The reflection type liquid crystal display device using the second phase difference plate 3 achieved by the uniaxial oriented film compensates for the light incident from the perpendicular direction to the substrates 6 and 16. The reflection type liquid crystal display device using the second phase difference plate 3 achieved by the three-dimensional phase difference film compensates for the light incident from oblique directions, too. The reflective index nz in the thickness-wise direction of the phase difference plate is optimized lest the compensation relation for the light incident from the oblique directions collapses. In this way, incidence angle dependence of light is minimized and visual field angle characteristics can be improved. Table 2 shows the characteristics of Example 6. A contrast of 7 and a reflection factor of 10% were obtained as the optical characteristics when a coefficient Z of 0.3 is employed, for example.

TABLE 2

Characteristics of Examples 6 and 7
(when three-dimensional phase difference plates of
Examples 1 and 2 are used in combination)

|  | coefficient Z | Contrast | reflection factor |
|---|---|---|---|
| Example 6 | 1.0 | 7 | 10% |
|  | 0.3 | 7 | 10% |
| Example 7 | 1.0 | 7 | 10% |
|  | 0.3 | 10 | 10% |

Figure 6:
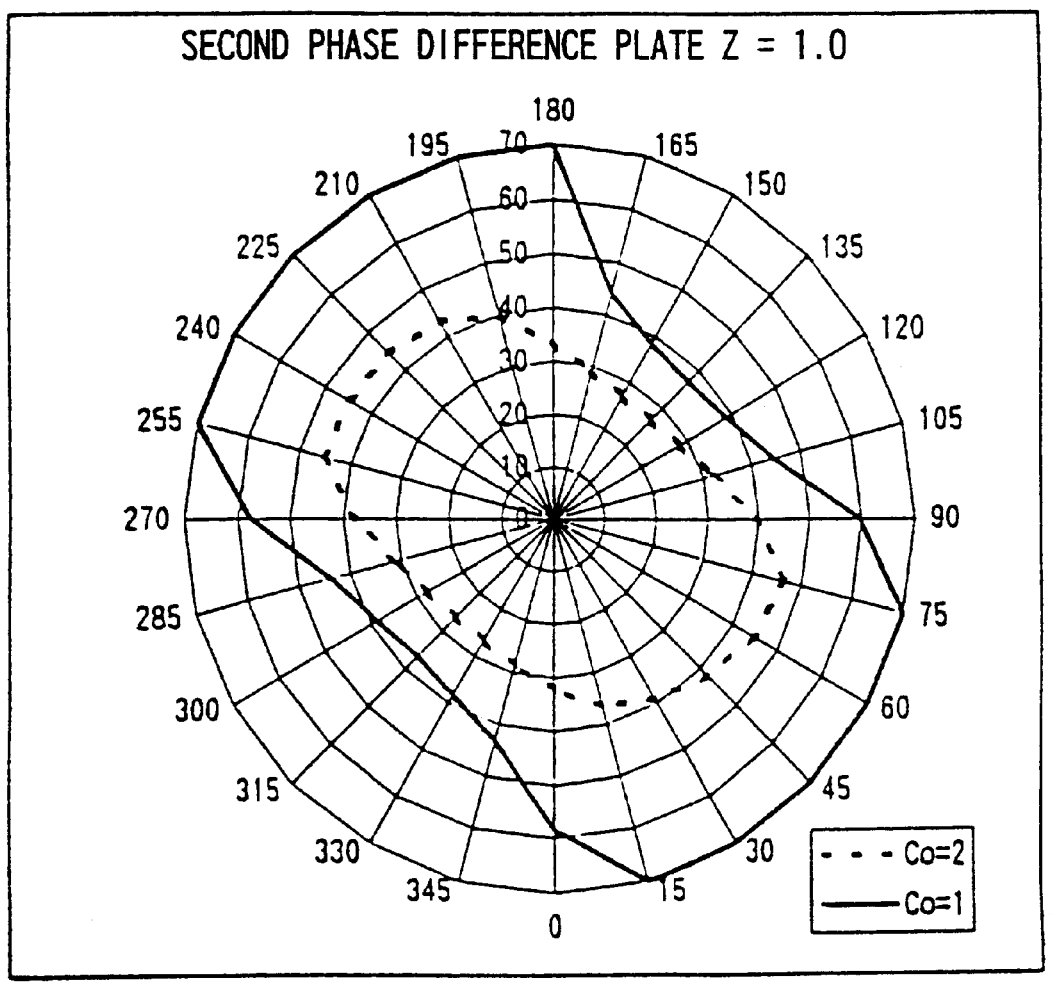
FIG. 6 is a graph showing an isocontrast curve of a reflecting type liquid crystal display device using a second phase difference plate having a coefficient Z=1.0.
Figure 7:
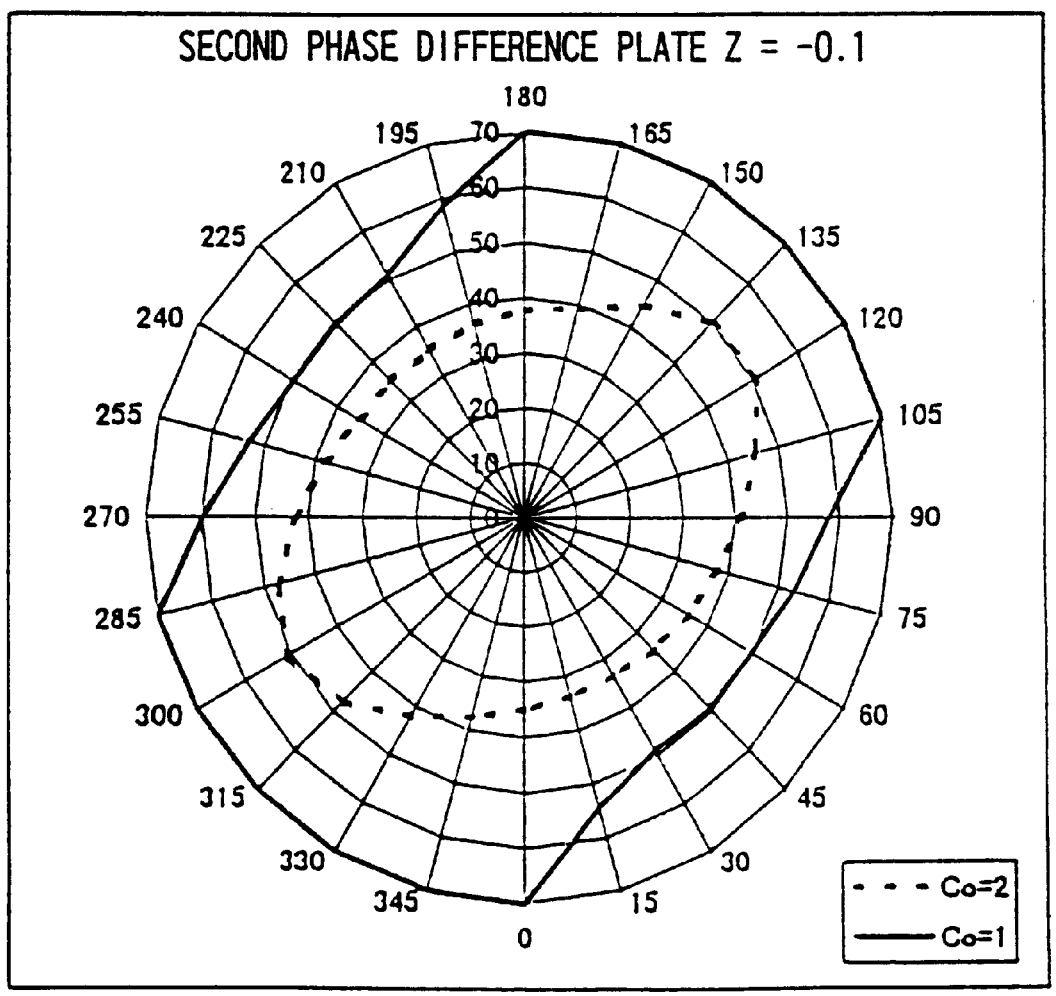
FIG. 7 is a graph showing the isocontrast curve of a reflecting type liquid crystal display device using a second phase difference plate having a coefficient Z=−0.1.
Figure 8:
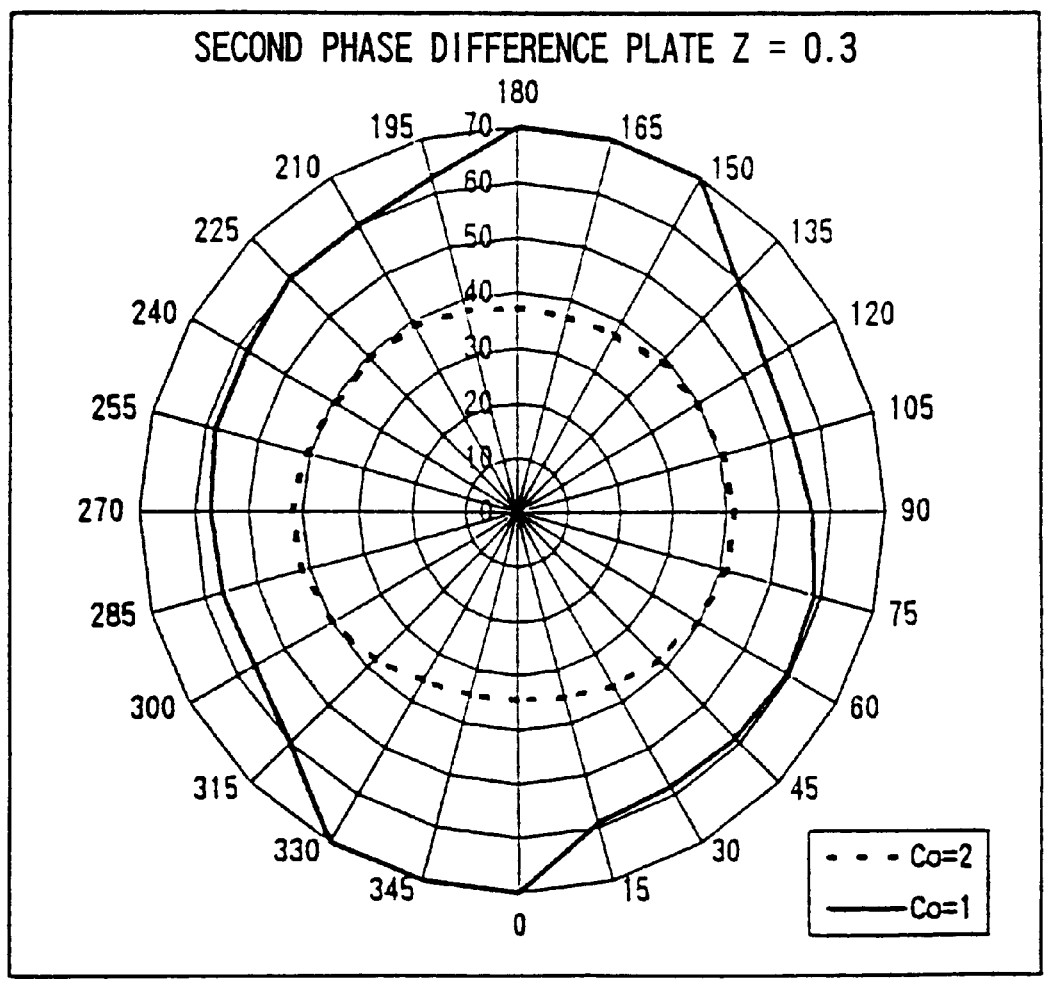
FIG. 8 is a graph showing the isocontrast curve of a reflecting type liquid crystal display device using a second phase difference plate having a coefficient Z=0.3.
Figure 9:
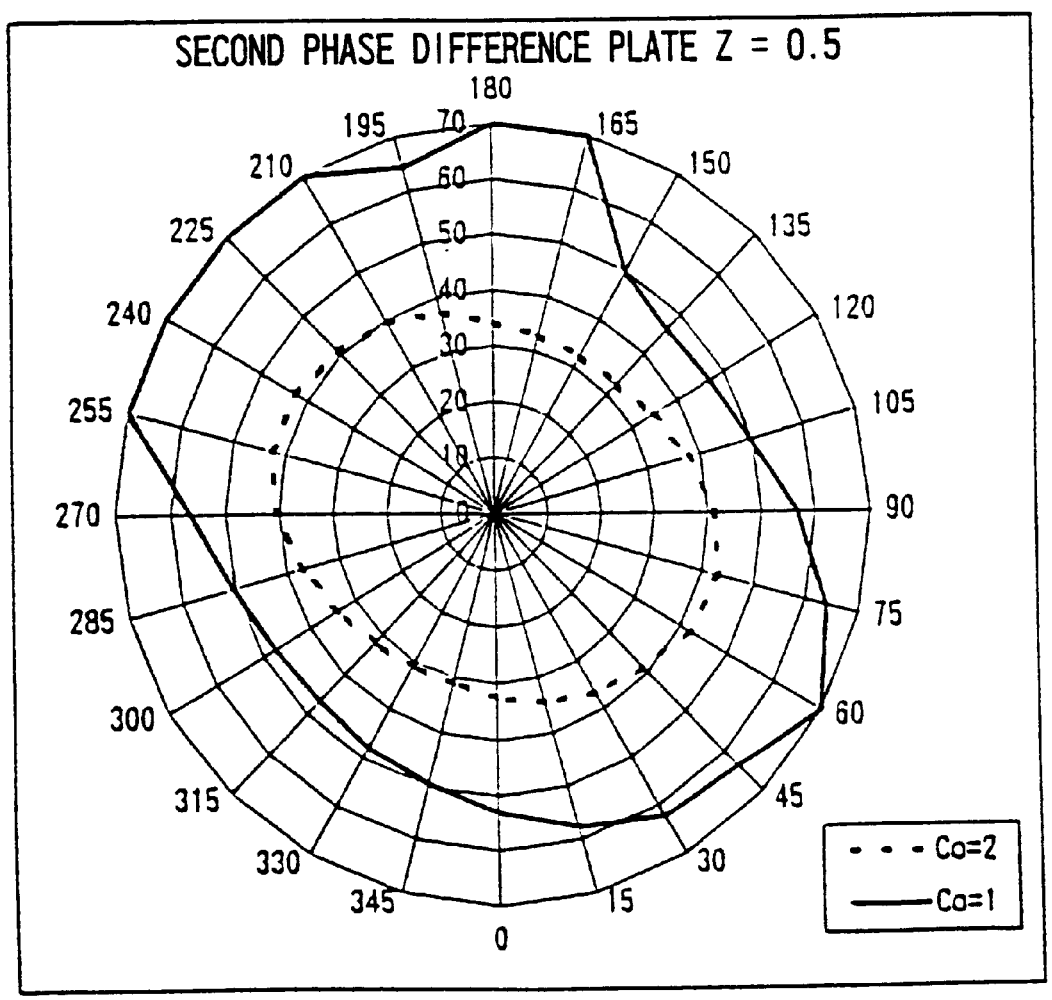
FIG. 9 is a graph showing the isocontrast curve of a reflecting type liquid crystal display device using a second phase difference plate having a coefficient Z=0.5.

FIG. 6 is a graph showing the isocontrast curve when the coefficient Z of the second phase difference plate 3 is Z=1.0. FIGS. 7, 8 and 9 are graphs showing the isocontrast curves when the coefficient Z is Z=−0.1, 0.3 and 0.5, respectively. Here, the parameters are set as listed below.

| ΔnLC · dLC: | 800 nm |
|---|---|
| Δn1 · d1: | 210 nm |
| Δn2 · d2: | 380 nm |
| twist angle χ: | 240° |
| angle θ: | −120° |
| angle φ: | −40° |
| angle ψ: | −25° |

Incidentally, the measurement is made under the irradiation of diffused light.

When the uniaxial oriented film is used as the second phase difference plate 3, the visual field angle characteristics are distorted. When the three-dimensional phase difference film is used, the balance of the visual field angle characteristics can be improved. When the three-dimensional phase difference film is used, the similar effects can be obtained by the similar operation not only when the parameters are set as listed above but also under other conditions. In other words, the visual field angle characteristics having a good balance can be obtained.

The slow axis 25 of the first phase difference plate 4 and the slow axis 24 of the second phase difference plate 3 are laminated within the range of 90 degrees in the opposite direction to the twist angle direction of the liquid crystal molecules of the liquid crystal layer 9. In other words, the slow axis 24 of the second phase difference plate 3 is set at an angle within the range of 90 degrees in a direction opposite to the twist direction from the major axis direction of the reflecting layer 15 side liquid crystal molecules of the liquid crystal layer 9 of the liquid crystal cell to the major axis direction of the first phase difference plate 4 side liquid crystal molecules of the liquid crystal layer 9 of the liquid crystal cell as viewed from the slow axis 25 of the first phase difference plate 4. In this way, a compensation function for the rotatory polarization of light can be provided.

A plurality of phase difference plates can be disposed. However, the increase of the number of parameters makes it difficult to optimize the contrast, lightness and tone, and invites the increase of the cost of production. Therefore, two phase difference plates 3 and 4 are disposed particularly preferably as in the foregoing embodiments. Incidentally, one phase difference plate can compensate for birefringence but cannot compensate for rotatory polarization.

The value ΔnLC·dLC of the liquid crystal layer 9 is set to at least 600 nm. When this value is smaller than 600 nm, the change amount of birefringence when the voltage is applied is small, and sufficient lightness cannot be obtained. Even when satisfactory black display is obtained, white display having high lightness cannot be obtained.

EXAMPLE 7

Figure 10:
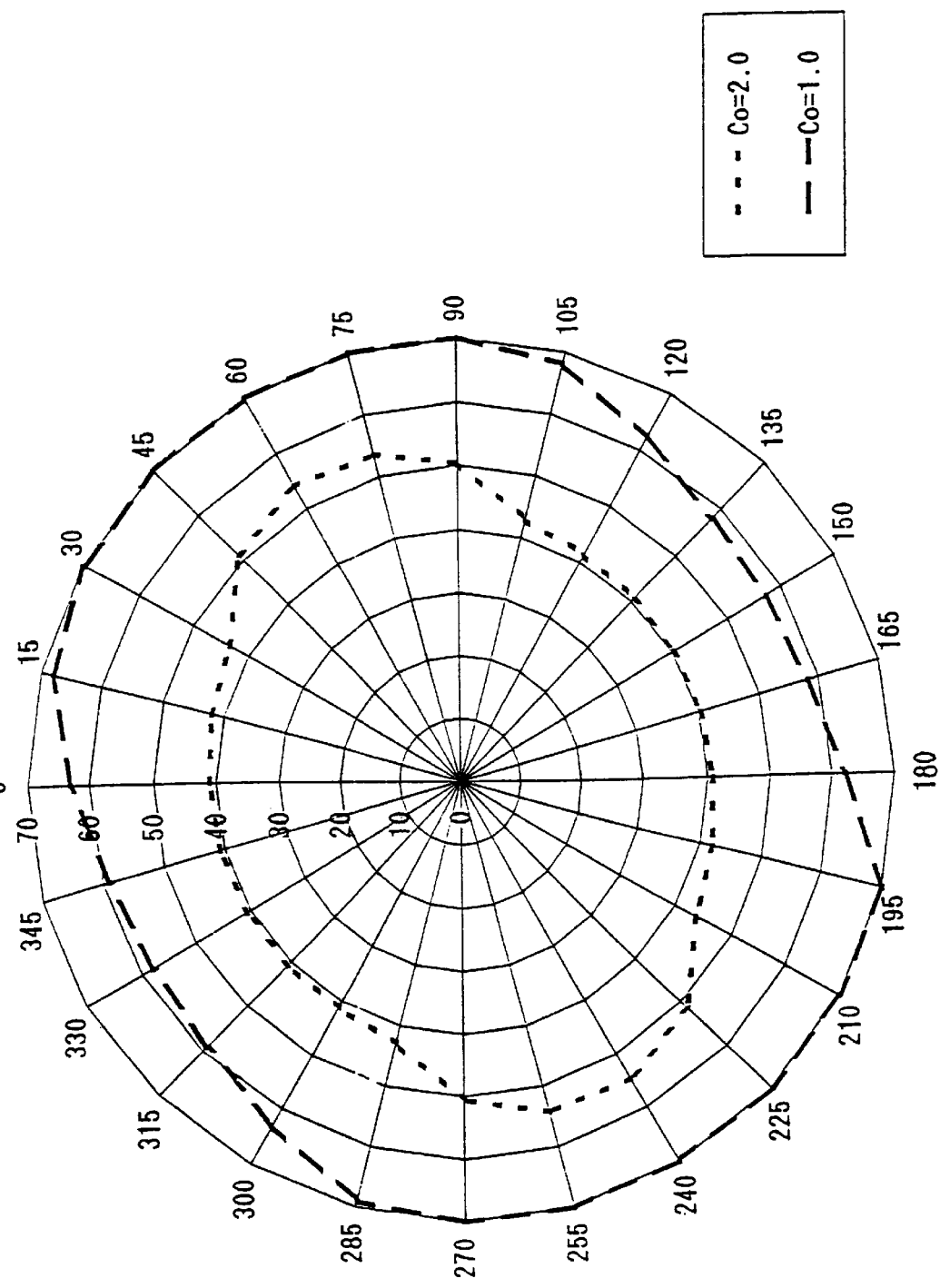
FIG. 10 is a graph showing the isocontrast curve of a reflecting type liquid crystal display device in the embodiment 7.

In Example 7 was used a three-dimensional phase difference film (a product of Nitto Denko K. K.) having a coefficient Z=0.3 for the second phase difference plate 3 in Example 2. FIG. 10 shows the isocontrast curve at this time and Table 2 shows the characteristics of Example 7. A contrast of 10 and a reflection factor of 10% were obtained as the optical characteristics when the three-dimensional phase difference plate having a coefficient Z=0.3 is used. Example 7 is superior to Example 6 in the visual field angle characteristics.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflecting type liquid crystal display device of NB mode comprising:

an STN type liquid crystal cell;

a first phase difference plate;

a second phase difference plate;

a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC·dLC of birefringence ΔnLC and thickness dLC of a liquid crystal layer of the liquid crystal cell is selected from a range of 660 nm to 830 nm, a product Δn1·d1 of birefringence Δn1 and thickness d1 of the first phase difference plate is selected from a range of 120 nm to 240 nm, and a product Δn2·d2 of birefringence Δn2 and thickness d2 of the second phase difference plate is selected from a range of 300 nm to 430 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −130° to −75°, an angle φ from the slow axis of the first phase difference plate to a slow axis of the second phase difference plate is selected from a range of −20° to −60°, and an angle φ from the slow axis of the second phase difference plate to an absorption axis of the polarizing plate is selected from a range of −15° to −45°.

2. A reflecting type liquid crystal display device of NB mode, comprising:

an STN type liquid crystal cell;

a first phase difference plate;

a second phase difference plate;

a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC·dLC of birefringence ΔnLC and thickness dLC of a liquid crystal layer of the liquid crystal cell is selected from a range of 750 nm to 850 nm, a product Δn1·d1 of birefringence Δn1 and thickness d1 of the first phase difference plate is selected from a range of 150 nm to 250 nm, and a product Δn2·d2 of birefringence Δn2 and thickness d2 of the second phase difference plate is selected from a range of 630 nm to 730 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −145° to −110°, an angle φ from the slow axis of the first phase difference plate to a slow axis of the second phase difference plate is selected from a range of −25° to −60°, and an angle φ from the slow axis of the second phase difference plate to an absorption axis of the polarizing plate is selected from a range of +10° to +40°.

3. A reflecting type liquid crystal display device of NB mode, comprising:

an STN type liquid crystal cell;

a first phase difference plate;

a second phase difference plate;

a polarizing plate, the first phase difference plate, second phase difference plate and polarizing plate being disposed in this order on one surface of the STN type liquid crystal cell; and reflecting means disposed on the other surface of the STN type liquid crystal cell, wherein a product ΔnLC·dLC of birefringence ΔnLC and thickness dLC of a liquid crystal layer of the liquid crystal cell is selected from a range of 800 nm to 900 nm, a product Δn1·d1 of birefringence Δn1 and thickness d1 of the first phase difference plate is selected from a range of 430 nm to 530 nm, and a product ΔnM2·d2 of birefringence Δn2 and thickness d2 of the second phase difference plate is selected from a range of 630 nm to 730 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −50° to −90°, an angle φ from the slow axis of the first phase difference plate to a slow axis of the second phase difference plate is selected from a range of −40° to −80°, and an angle φ from the slow axis of the second phase difference plate to an absorption axis of the polarizing plate is selected from a range of +10° to +40°.

4. A reflecting type liquid crystal display device of NB mode, comprising:

an STN type liquid crystal cell;
a first phase difference plate;
a second phase difference plate;
a polarizing plate,
the first phase difference plate, second phase difference plate and polarizing plate being disposed in this order on one surface of the STN type liquid crystal cell; and
reflecting means disposed on the other surface of the STN type liquid crystal cell,
wherein a product ΔnLC·dLC of birefringence ΔnLC and thickness dLC of a liquid crystal layer of the liquid crystal cell is selected from a range of 820 nm to 920 nm, a product Δn1·d1 of birefringence Δn1 and thickness d1 of the first phase difference plate is selected from a range of 470 nm to 570 nm, and a product Δn2·d2 of birefringence Δn2 and thickness d2 of the second phase difference plate is selected from a range of 350 nm to 450 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −70° to −110°, an angle φ from the slow axis of the first phase difference plate to a slow axis of the second phase difference plate is selected from a range of −40° to −80°, and an angle φ from the slow axis of the second phase difference plate to an absorption axis of the polarizing plate is selected from a range of −10° to −40°.

5. A reflecting type liquid crystal display device of NB mode, comprising:

an STN type liquid crystal cell;
a first phase difference plate;
a second phase difference plate;
a polarizing plate,
the first phase difference plate, second phase difference plate and polarizing plate being disposed in this order on one surface of the STN type liquid crystal cell; and
reflecting means disposed on the other surface of the STN type liquid crystal cell,
wherein a product ΔnLC·dLC of birefringence ΔnLC and thickness dLC of a liquid crystal layer of the liquid crystal cell is selected from a range of 870 nm to 970 nm, a product Δn1·d1 of birefringence Δn1 and thickness d1 of the first phase difference plate is selected from a range of 50 nm to 150 nm, and a product Δn2·d2 of birefringence Δn2 and thickness d2 of the second phase difference plate is selected from a range of 600 nm to 800 nm, and wherein in the case where a twist direction of a major axis of liquid crystal molecules of the liquid crystal layer of the liquid crystal cell from the reflecting means side to the first phase difference plate side is assumed to be a positive direction, a twist angle χ of liquid crystal molecules from a major axis of the reflecting means side liquid crystal molecules of the liquid crystal layer of the liquid crystal cell to a major axis of the first phase difference plate side liquid crystal molecules of the liquid crystal layer of the liquid crystal cell is selected from a range of 220° to 260°, an angle θ from a major axis of the first phase difference plate side liquid crystal molecules of the liquid crystal layer of the liquid crystal cell to a slow axis of the first phase difference plate is selected from a range of −60° to −105°, an angle φ from the slow axis of the first phase difference plate to a slow axis of the second phase difference plate is selected from a range of −10° to −40°, and an angle φ from the slow axis of the second phase difference plate to an absorption axis of the polarizing plate is selected from a range of −15° to −40°.

6. The reflecting type liquid crystal display device of any one of claims 1 through 5, wherein when the refractive indices of the second phase difference plate in the in-plane direction are ns and nf and the refractive index in the thickness-wise direction is nz, a relationship of ns>nz>nf or nz>ns>nf is satisfied.

7. The reflecting type liquid crystal display device of claim 6, wherein when the refractive index of the second phase difference plate in the direction of the slow axis is ns, the refractive index in the direction of the fast axis is nf and the refractive index in the thickness-wise direction is nz, and as a parameter representing a magnitude of biaxial refraction is defined a coefficient Z as follows:

$$Z=(ns-nz)/(ns-nf),$$

the coefficient Z is selected from a range of −0.1 to 0.5.

8. The reflecting type liquid crystal display device of any one of claims 1 through 5, wherein the reflecting type liquid crystal display device further comprises circularly polarized light selective irradiation means for selectively irradiating the circularly polarized light to the reflecting means from the side opposite to the liquid crystal cell of the reflecting means, and the reflecting means has a function of transmitting a part of light.

9. The reflecting type liquid crystal display device of any one of claims 1 through 5, wherein the liquid crystal cell is fabricated by sandwiching the liquid crystal layer between a pair of substrates, and plastic substrates are used as the substrates.

* * * * *